(12) United States Patent
Parada et al.

(10) Patent No.: US 9,146,124 B2
(45) Date of Patent: Sep. 29, 2015

(54) HELMET-BASED NAVIGATION NOTIFICATIONS

(71) Applicant: Nokia Corporation, Espoo (FI)

(72) Inventors: Rita Parada, San Francisco, CA (US); Lina Ester Liner, Palo Alto, CA (US); Charlie Matthew Sutton, San Francisco, CA (US); Brody Jay Larson, San Mateo, CA (US); Michelle Christine Shilstone, San Rafael, CA (US); Laura Gigi Lee, San Francisco, CA (US); Nick John Foster, San Francisco, CA (US); Markus Eklund, Pleasanton, CA (US)

(73) Assignee: Nokia Technologies Oy, Espoo (FI)

( * ) Notice: Subject to any disclaimer, the term of this patent is extended or adjusted under 35 U.S.C. 154(b) by 67 days.

(21) Appl. No.: 13/718,270

(22) Filed: Dec. 18, 2012

(65) Prior Publication Data

US 2014/0167986 A1 Jun. 19, 2014

(51) Int. Cl.
*G08G 1/09* (2006.01)
*G01C 21/36* (2006.01)
*G08G 1/0967* (2006.01)
*G08G 1/0968* (2006.01)
*G02B 27/01* (2006.01)

(52) U.S. Cl.
CPC .......... *G01C 21/3626* (2013.01); *G01C 21/365* (2013.01); *G02B 27/017* (2013.01); *G08G 1/0967* (2013.01); *G08G 1/0968* (2013.01); *G02B 2027/014* (2013.01)

(58) Field of Classification Search
CPC ... G01C 21/00; G01C 21/3661; G01C 21/365
USPC ......................................................... 340/905
See application file for complete search history.

(56) References Cited

U.S. PATENT DOCUMENTS 6,934,633 B1 8/2005 Gallagher et al.
2003/0071766 A1* 4/2003 Hartwell et al. ................... 345/8
2003/0212485 A1* 11/2003 Michmerhuizen ............ 701/200

(Continued)

FOREIGN PATENT DOCUMENTS

DE 10049693 4/2002
EP 0 722 109 A1 7/1996

(Continued)

OTHER PUBLICATIONS

"ECE44x Project 18—Motorcycle Helmet Heads-up Display"; Oregon State University; retrieved on Dec. 27, 2012 from: <http://beaversource.oregonstate.edu/projects/44x201118/wiki/TechnologyResearch>.

(Continued)

*Primary Examiner* — Kerri McNally
(74) *Attorney, Agent, or Firm* — Alston & Bird LLP

(57) ABSTRACT

Methods, apparatuses, and computer program products are herein provided for causing navigation notifications tailored for a helmet to be presented in the helmet. A determination may be made, such as by a processor, that a helmet is being worn by a user while a navigation event is occurring. A set of navigation notifications associated with the navigation event may be determined, where the set of navigation notifications is tailored for presentation in the helmet, and the set of navigation notifications may be presented in the helmet. Corresponding apparatuses and computer program products are also provided.

25 Claims, 11 Drawing Sheets

(56) References Cited

U.S. PATENT DOCUMENTS

| | | | |
|---|---|---|---|
| 2010/0102970 A1 | 4/2010 | Hertz et al. | |
| 2010/0157432 A1 | 6/2010 | Sugihara et al. | |
| 2010/0238161 A1 | 9/2010 | Varga et al. | |
| 2012/0188083 A1 | 7/2012 | Miller et al. | |
| 2012/0218172 A1* | 8/2012 | Border et al. | 345/8 |
| 2013/0305437 A1* | 11/2013 | Weller et al. | 2/422 |

FOREIGN PATENT DOCUMENTS

| | | |
|---|---|---|
| EP | 1 515 295 A2 | 3/2005 |
| WO | WO-94/27268 | 11/1994 |
| WO | WO-2011/018168 | 2/2011 |
| WO | WO 2011/129740 A1 | 10/2011 |

OTHER PUBLICATIONS

"Eye-tracking system for active safety;"Active Safety—Chalmers: eye tracking; retrieved on Dec. 27, 2012 from: <http://activesafety.wikispot.org/eye_tracking>.

Messenger, S.; "Students' Wind-and Solar-Powered Bike Helmet Charges Gadgets While Protecting Riders;" treehugger; dated May 13, 2010; retrieved on Dec. 27, 2012 from: <http://www.treehugger.com/cars/students-wind-and-solar-powered-bike-helmet-charges-gadgets-while-protecting-riders.html>.

Quick, D.; "Helmet-mountable ICEdot Crash Sensor calls for help if you can't:" gizmag; dated Sep. 17, 2012; retrieved on Dec. 27, 2012 from: <http://www.gizmag.com/icedot-crash-sensor/24160/>.

International Search Report and Written Opinion for Application No. PCT/FI2013/051102 dated Mar. 10, 2014.

* cited by examiner

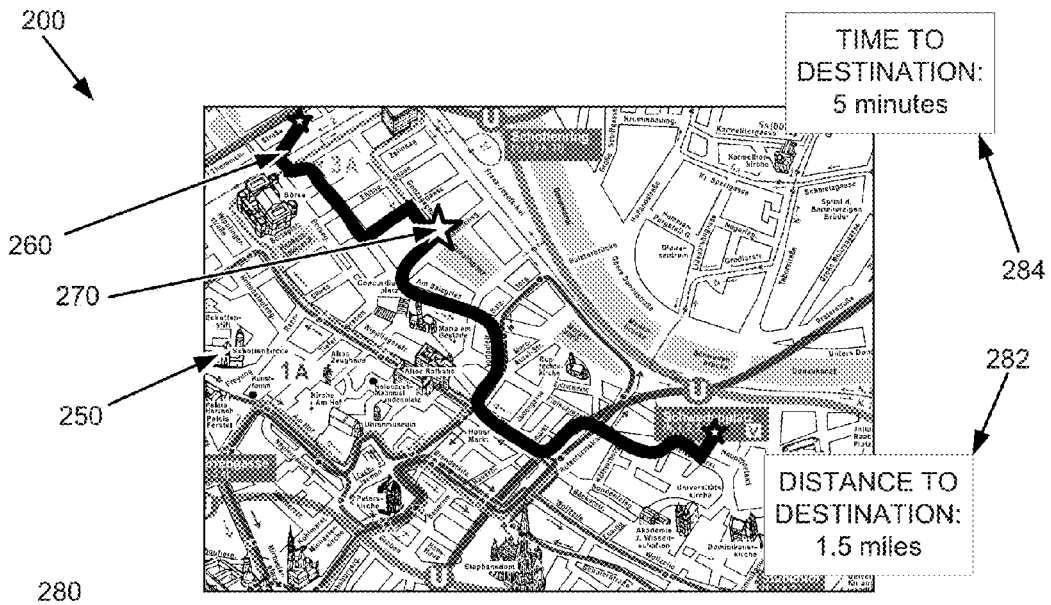

1. Start out going southwest on S Tryon St toward W 4th St.   0.5 mi
2. Turn right onto W Hill St.   0.1 mi
3. Merge onto I-277 S/US-74 W.   0.6 mi
4. Merge onto I-77 N/US-21 N via EXIT 1C toward Statesville.   1.6 mi
5. Merge onto NC-16 N via EXIT 11B on the left.   2.7 mi
6. Turn left onto N Hoskins Rd.   0.1 mi
7. Turn right onto Rozzelles Ferry Rd.   2.5 mi
8. Turn right onto Valleydale Rd.   0.4 mi
9. Turn right onto Summerville Rd.   0.4 mi
10. Turn left onto Mint St.   0.1 mi Arrive at 1700 Mint St.

FIG. 6

HELMET-BASED NAVIGATION NOTIFICATIONS

TECHNOLOGICAL FIELD

Example embodiments of the present invention relate generally to user interface technology and, more particularly, relate to methods, apparatuses, and computer program products for causing navigation notifications tailored for a helmet to be presented in the helmet.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in the development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of most all socioeconomic backgrounds.

BRIEF SUMMARY

Accordingly, embodiments of an apparatus, method, and computer program product are described that provide a helmet-based display interface that presents navigation information that is tailored to be presented in a helmet. In particular, embodiments of an apparatus for providing a helmet-based display interface may include at least one processor and at least one memory including computer program code. The at least one memory and the computer program code may be configured to, with the processor, cause the apparatus to determine that a helmet is being worn by a user while a navigation event is occurring, determine a set of navigation notifications associated with the navigation event, and cause the set of navigation notifications to be presented in the helmet. The set of navigation notifications may be tailored for presentation in the helmet.

The set of navigation notifications may be a first set of navigation notifications, and the memory and the computer program code may be further configured to, with the processor, cause the apparatus to determine the first set of navigation notifications by determining the first set of navigation notifications to be different than a second set of navigation notifications associated with the navigation event, where the second set of navigation notifications is not tailored for presentation in the helmet. The memory and the computer program code may be further configured to, with the processor, cause the apparatus to determine the first set of navigation notifications by determining the set of navigation notifications to include fewer navigation notifications than the second set of navigation notifications associated with the navigation event.

In some embodiments, the memory and the computer program code may be further configured to, with the processor, cause the apparatus to determine the set of navigation notifications by determining the set of navigation notifications to not include presentation of a map. The memory and the computer program code may be further configured to, with the processor, cause the apparatus to determine the set of navigation notifications by determining the set of navigation notifications to include at least one motorcycle specific notification, wherein the at least one motorcycle specific notification comprises at least one of: a grade of an upcoming curve; a grade of an upcoming hill; or weather conditions. Additionally or alternatively, the memory and the computer program code may be further configured to, with the processor, cause the apparatus to determine the set of navigation notifications by determining the set of navigation notifications based on a user-configured set of navigation notifications.

In some embodiments, the memory and the computer program code may be further configured to, with the processor, cause the apparatus to determine the set of navigation notifications by determining the set of navigation notifications based on a number of notification display regions in the helmet. The memory and the computer program code may be further configured to, with the processor, cause the apparatus to determine the set of navigation notifications by determining an allocation of the set of navigation notifications among the notification display regions in the helmet. Moreover, the memory and the computer program code may be further configured to, with the processor, cause the apparatus to determine the set of navigation notifications by determining an allocation of the set of navigation notifications among the notification display regions in the helmet based on a user-configured allocation setting.

In other embodiments, a method and a computer program product are described for providing a helmet-based display interface by determining that a helmet is being worn by a user while a navigation event is occurring, determining a set of navigation notifications associated with the navigation event, and causing the set of navigation notifications to be presented in the helmet. The set of navigation notifications may be tailored for presentation in the helmet.

In some cases, the set of navigation notifications may be a first set of navigation notifications, and determining the first set of navigation notifications may comprise determining the first set of navigation notifications to be different than a second set of navigation notifications associated with the navigation event, where the second set of navigation notifications is not tailored for presentation in the helmet. Determining the first set of navigation notifications may comprise determining the first set of navigation notifications to include fewer navigation notifications than the second set of navigation notifications associated with the navigation event.

Determining the set of navigation notifications may, in some embodiments, comprise determining the set of navigation notifications to not include presentation of a map. Additionally or alternatively, determining the set of navigation notifications may comprise determining the set of navigation notifications to include at least one motorcycle specific notification, wherein the at least one motorcycle specific notification comprises at least one of: a grade of an upcoming curve; a grade of an upcoming hill; or weather conditions. In still other embodiments, determining the set of navigation notifications may comprise determining the set of navigation notifications based on a user-configured set of navigation notifications.

Determining the set of navigation notifications may comprise determining the set of navigation notifications based on a number of notification display regions in the helmet. Determining the set of navigation notifications may comprise determining an allocation of the set of navigation notifications among the notification display regions in the helmet. Furthermore, determining the set of navigation notifications may comprise determining an allocation of the set of navigation notifications among the notification display regions in the helmet based on a user-configured allocation setting.

In still other embodiments, an apparatus is described for providing a helmet-based display interface. The apparatus may include means for determining that a helmet is being worn by a user while a navigation event is occurring, means for determining a set of navigation notifications associated with the navigation event, and means for causing the set of navigation notifications to be presented in the helmet. The set of navigation notifications may be tailored for presentation in the helmet, as described below.

BRIEF DESCRIPTION OF THE DRAWINGS

Figure 1:
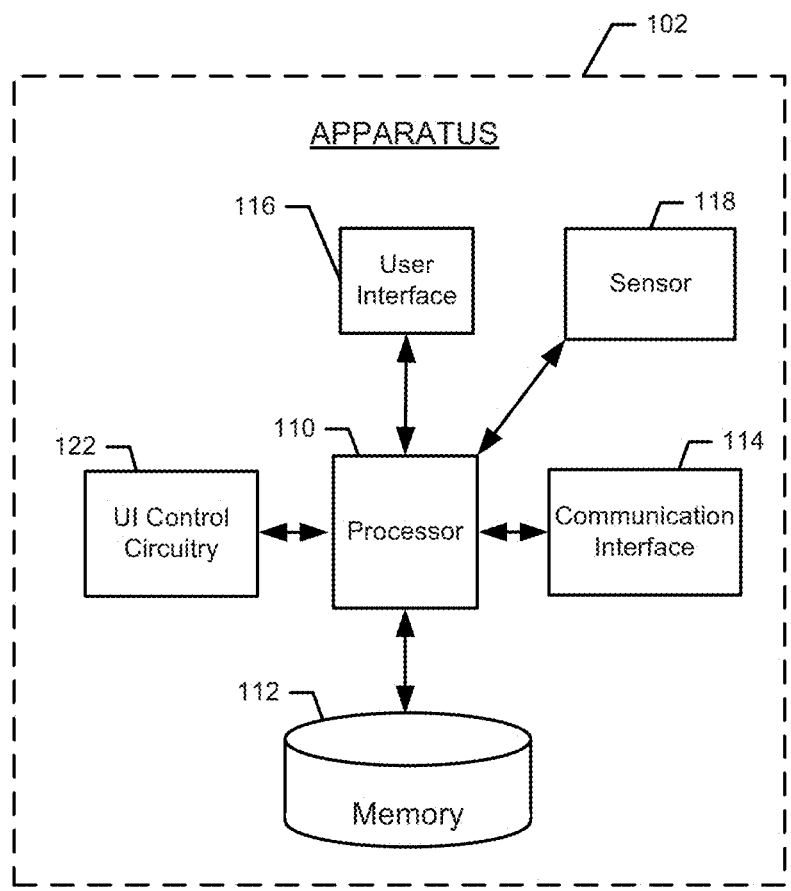
Figure 2:
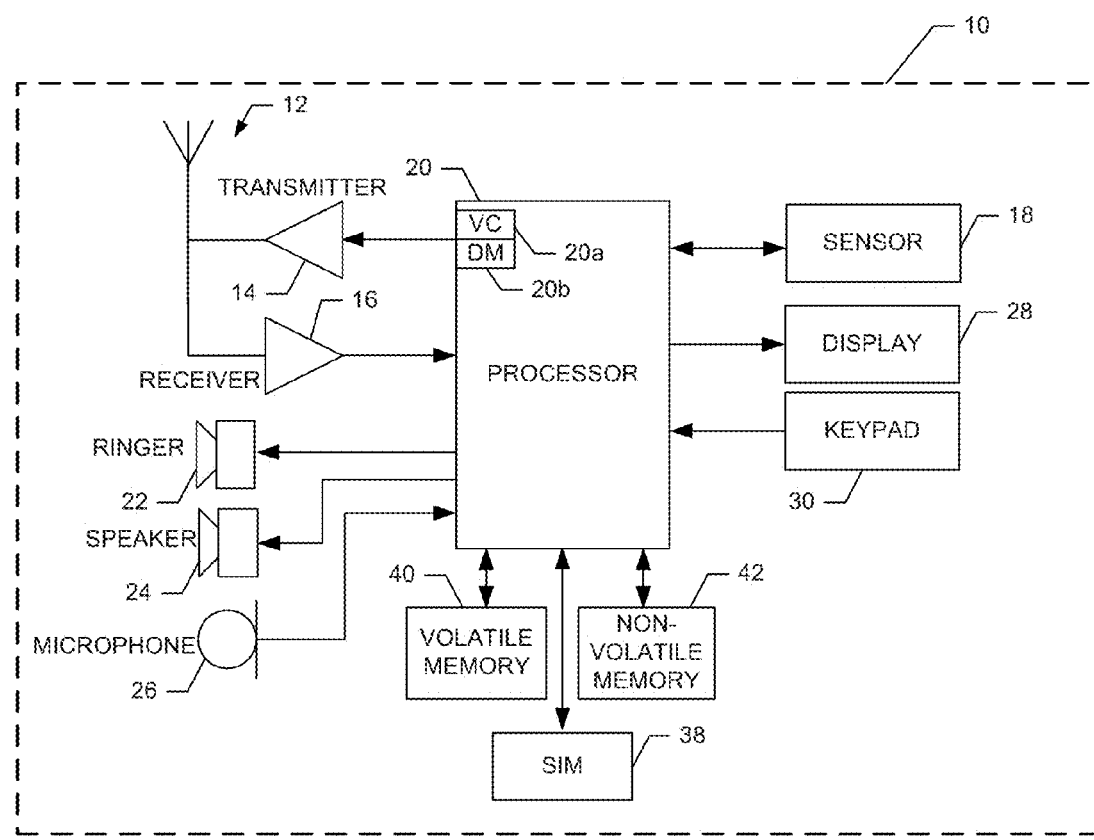
Figure 3:
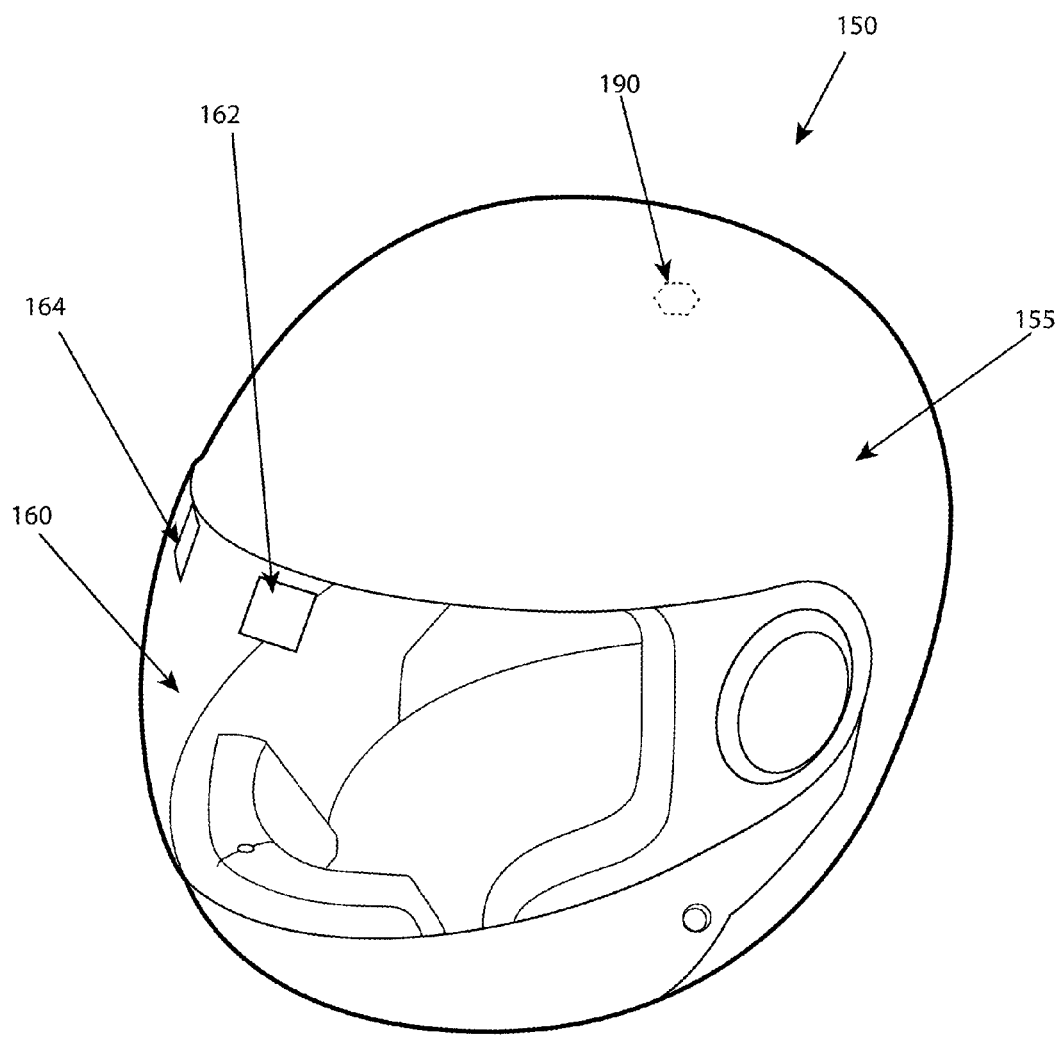
Figure 4:
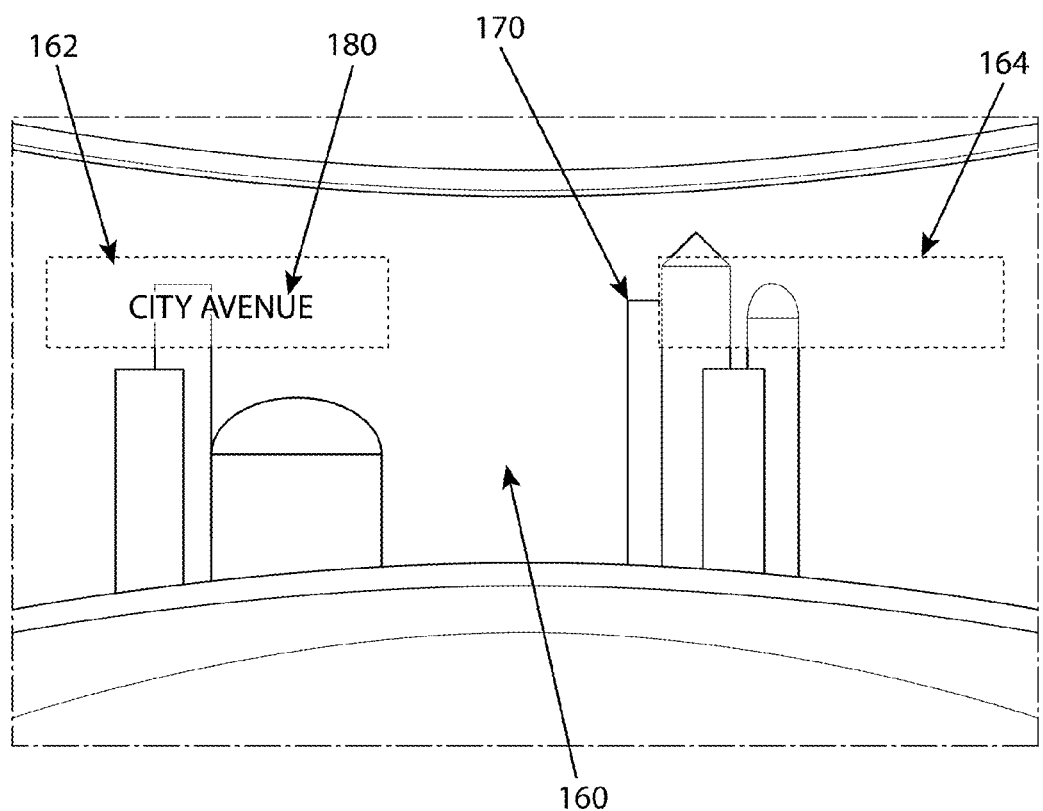
Figure 5:
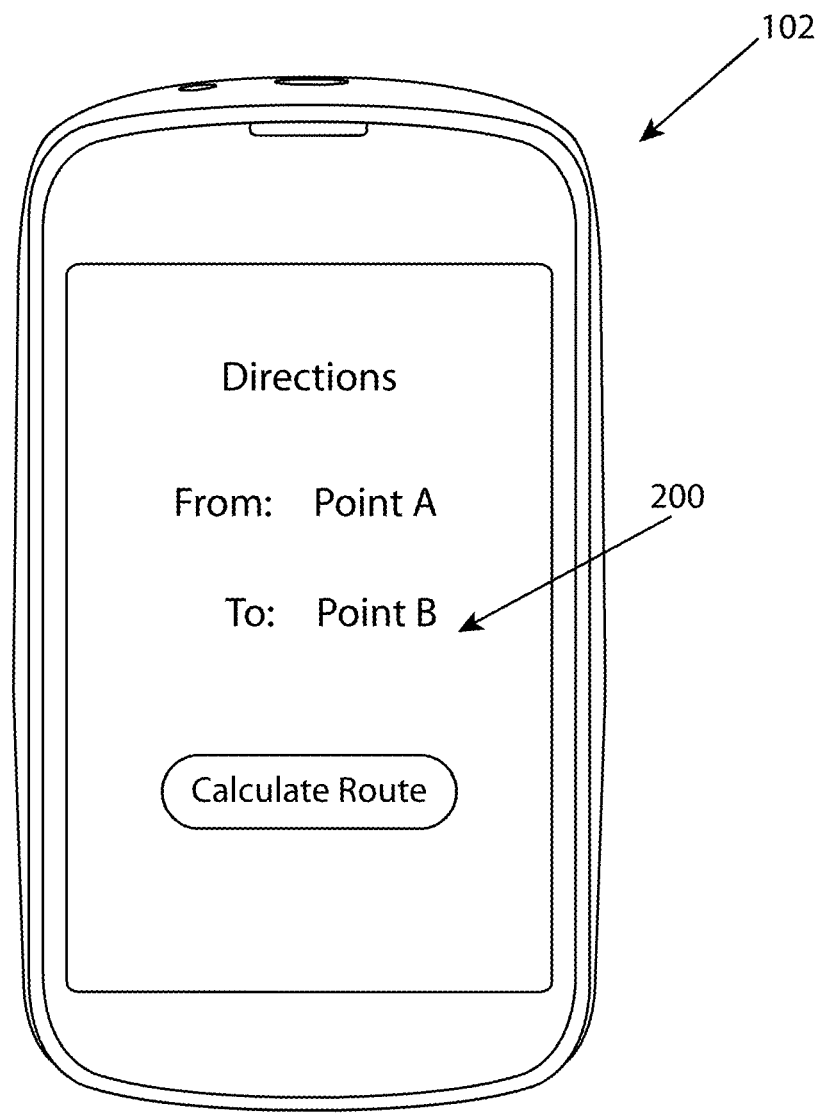
Figure 7:
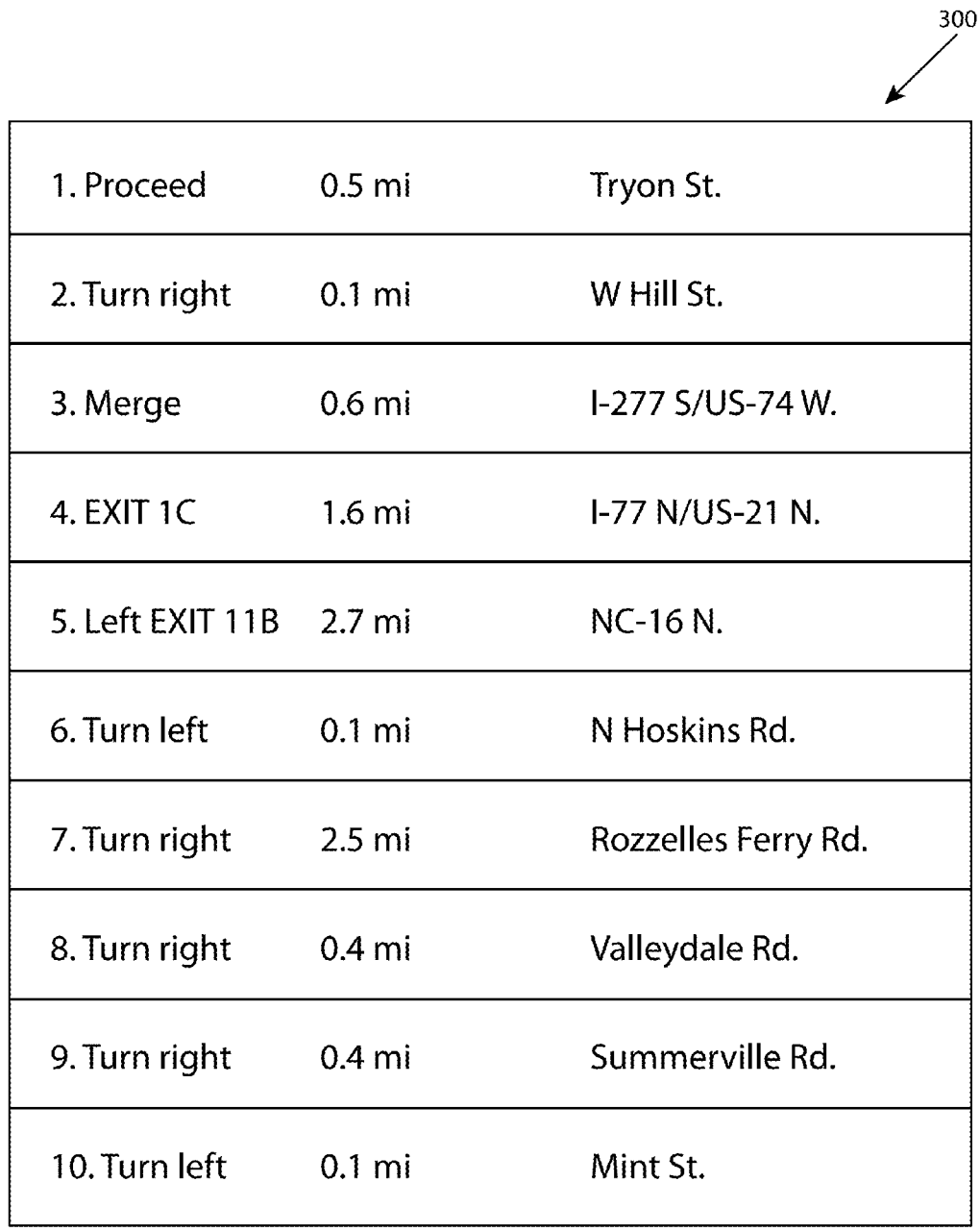
Figure 8:
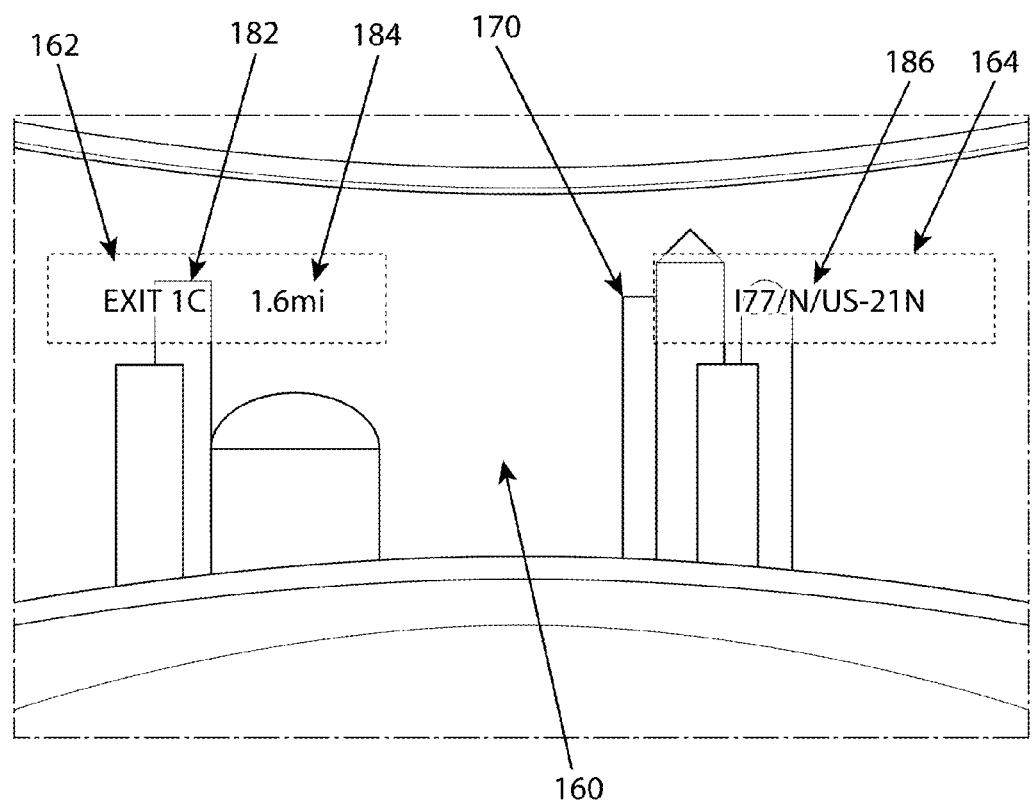
Figure 9:
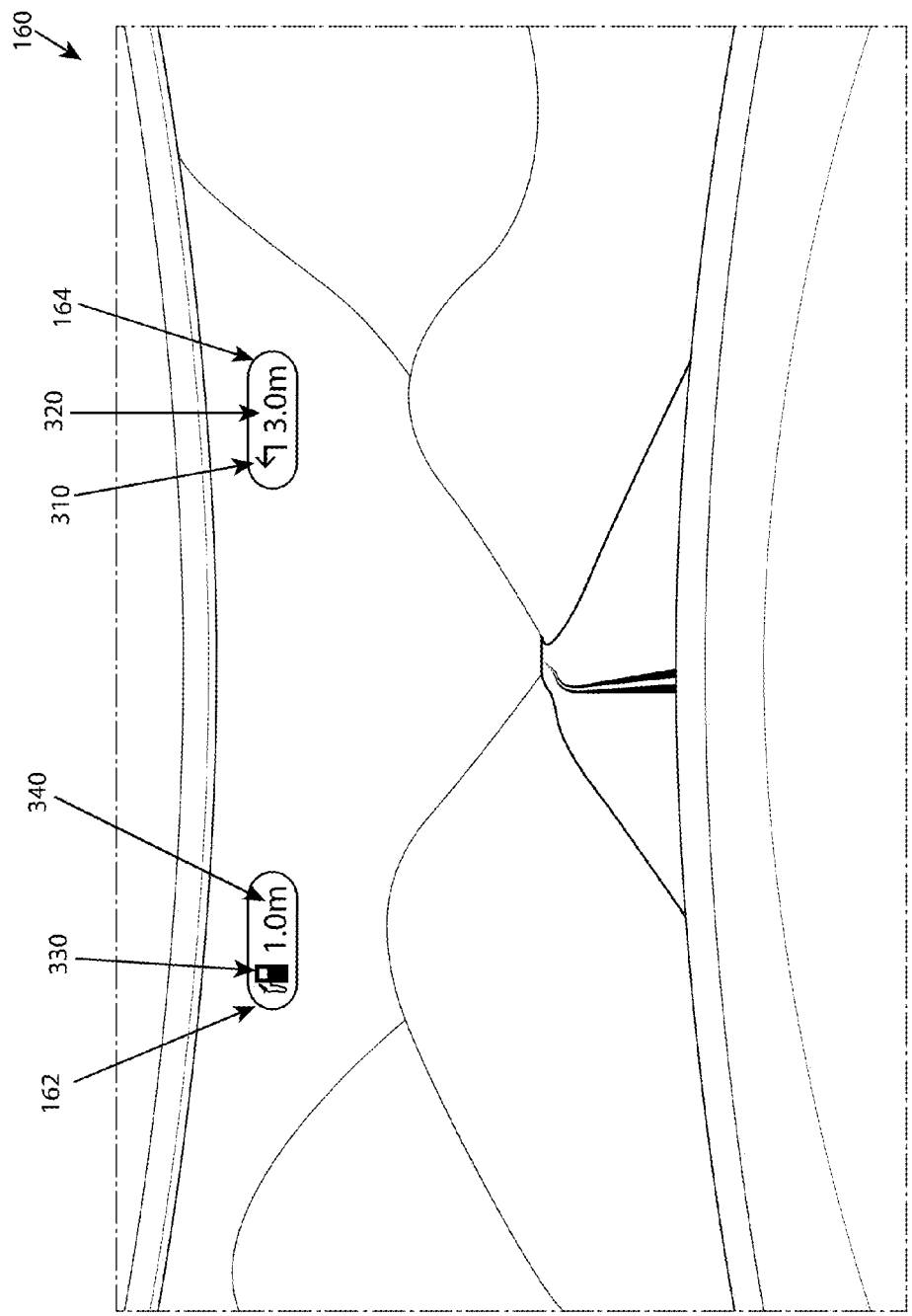
Figure 10:
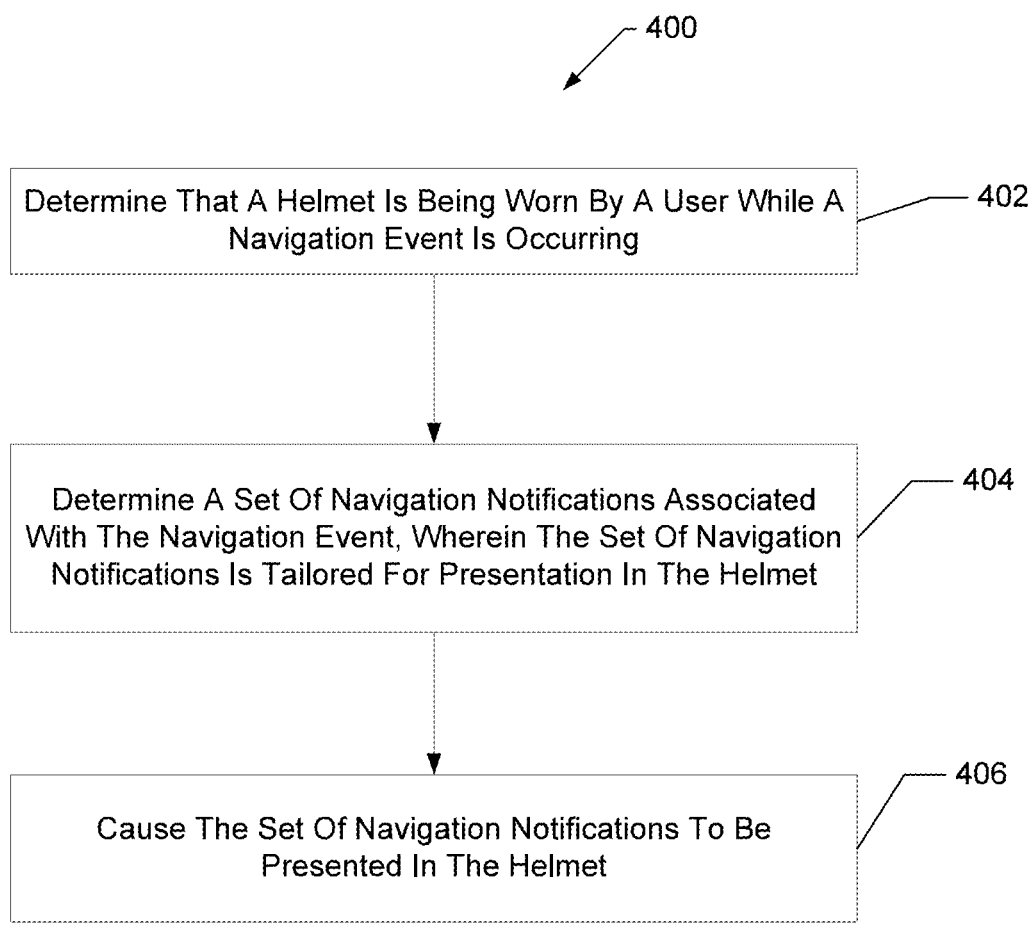
Figure 11:
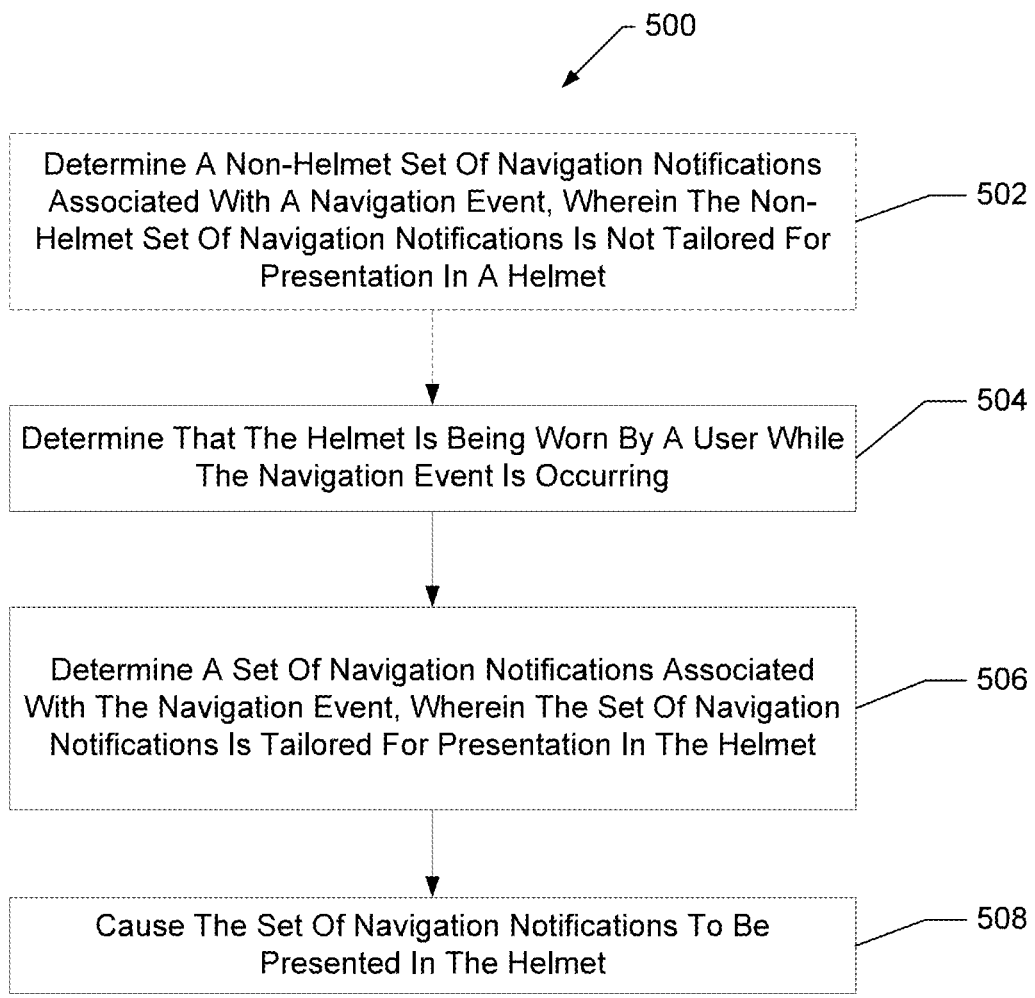

Having thus described embodiments of the invention in general terms, reference will now be made to the accompanying drawings, which are not necessarily drawn to scale, and wherein:

FIG. 1 illustrates a block diagram of an apparatus with a user interface according to an example embodiment;

FIG. 2 is a schematic block diagram of a mobile terminal according to an example embodiment;

FIG. 3 illustrates an example helmet with a visor that includes a pass-through display in accordance with an example embodiment of the present invention;

FIG. 4 illustrates an example view through a visor with display regions in accordance with an example embodiment of the present invention;

FIG. 5 illustrates a touch display on a device used to obtain navigation data in accordance with an example embodiment described herein;

FIG. 6 illustrates navigation data presented to a user via the touch display of FIG. 5 in accordance with an example embodiment described herein;

FIG. 7 illustrates a set of navigation notifications in accordance with an example embodiment described herein;

FIG. 8 illustrates the presentation of portions of a set of navigation notifications in display regions provided on a visor in accordance with an example embodiment described herein;

FIG. 9 illustrates a view through a pass-through display in accordance with an example embodiment described herein;

FIG. 10 illustrates a flowchart according to an example method for causing navigation notifications tailored for a helmet to be presented in the helmet in accordance with an example embodiment described herein; and FIG. 11 illustrates a flowchart according to another example method for causing navigation notifications tailored for a helmet to be presented in the helmet in accordance with an example embodiment described herein.

DETAILED DESCRIPTION

Some embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described as using a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Conventional navigation devices and systems are not optimized for use by motorcycle riders. Most conventional devices are handheld devices, are attached to the motorcycle's handle bar, or are mounted to the motorcycle tank and require the rider to take his or her eyes off the road to view the navigation information displayed. Although attention to the road is important for the safety of drivers of any type of vehicle, it is especially important in the case of motorcycles as motorcycles tend to be operated at high speeds and motorcycle riders are especially vulnerable to even small changes in the road surface and environmental conditions. Any distraction to the operator of a motorcycle can thus have dire consequences, and any delay in the operator's reaction time may put the operator at great risk.

Conventional navigation devices, such as conventional Global Positioning System (GPS) devices, are configured to provide a fairly robust display and interaction model, which provides an abundance of information to the user. Some of this information may not be necessary or useful to the operator of a motorcycle and may in fact be distracting and unnecessarily obstruct the operator's view of the road ahead. Thus, while conventional head-mounted display(s) may allow for display of information across some helmet visors, motorcyclists in particular may benefit from having only a minimal amount of information displayed while driving.

Accordingly, embodiments of the present invention are configured to allow the operator of a motorcycle and other vehicles to keep his attention more focused on the road by providing a helmet-based display interface that presents navigation information that is tailored to be presented in a helmet. Apparatuses, systems, and methods are thus described that provide for a specialized set of navigation instructions to be created and displayed to the user that are tailored to the needs of the motorcycle operator when a display-enabled motorcycle helmet is connected to a navigation device. Embodiments of the invention further provide for determining and presenting additional navigation information that, while not necessarily applicable or useful to general navigation, may be essential for the operator of a motorcycle. Such information may include information regarding the degree of an upcoming curve in the road, as well as hill elevation and slope. Moreover, embodiments of the invention allow the user to customize the displayed information to more fully meet the user's needs, as described in greater detail below.

FIG. 1 illustrates a block diagram of an apparatus 102 for causing navigation notifications tailored for a helmet to be presented in the helmet. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a display. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs (e.g., applications), which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a pass-through display, a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, sensor 118, and/or UI control circuitry 122, such as via a bus.

The sensor 118 may be in communication with the processor 110, user interface 116, and/or UI control circuitry 122. In embodiments wherein the apparatus 102 is embodied as a mobile terminal 10, the sensor 118 may be embodied as or comprise the sensor 18 (shown in FIG. 2). In some embodiments, the sensor 118 may be configured to monitor a user's eyes, such as by tracking a user's gaze, detecting the location and/or focus point of the user's eyes, etc. For example, the sensor 118 may be configured to transmit a beam or other signal (e.g., an infrared light) that bounces off the user's eyes (or eyelids). The sensor 118 may also be configured to receive the return beam or other signal. Additionally or alternatively, the sensor 118 may use other functionality (e.g., pictures and/or video taken with a camera) to monitor the user's eyes (or eyelids). Along these same lines, the sensor 118 may be configured to detect the size of a user's pupil in order to determine the user's focus point in a three-dimensional environment (e.g., depth of the user's focus point). Similarly, the sensor 118 may be configured to monitor other features of the user, such as the degree of movement of the user's gaze, movement of the user's eyelids, among others. In some embodiments, the sensor 118 may comprise a gaze tracker.

Additionally or alternatively, in some embodiments the sensor 118 may include other types of sensors, such as proximity sensor, light sensor, gyroscope, camera, heart rate monitor, magnetometer, and/or accelerometer. In this regard, the sensor 118 may include an inertial measurement unit (IMU) or other electronic device that measures and provides data regarding velocity, orientation, and gravitational forces of or imparted on the sensor or an object to which the sensor is attached. In some embodiments, for example, the sensor 118 may be disposed on a helmet worn by a user. The sensor 118, such as via the IMU, may in some cases be configured to sense the helmet's movement with respect to a reference position. For example, the reference position may be a stationary state of the helmet, such as when the helmet is stored or being worn by a user who is not moving or is moving slowly (e.g., walking or standing). As such, the sensor 118 may be configured to sense whether the helmet is being worn by a user in transit (e.g., a user riding a motorcycle or other vehicle). In other embodiments, the sensor 118 may be configured to detect when the helmet is surrounding the head of a user (e.g., being worn), regardless of the movement of the user, such as when the sensor comprises a proximity sensor, a light sensor, and/or a heat sensor, for example.

In some embodiments, the sensor 118 may provide output (e.g., signals, beams, pictures, videos, etc.) to the processor 110 to enable the processor 110 to determine certain circumstances regarding the state of the user (e.g., whether the user is wearing the helmet and/or whether the user is in motion, such as riding a motorcycle). This information may be used to determine any number of characteristics related to the user. For example, in the case of gaze detection, the information may be used to determine that the user's eyes have moved toward a peripheral notification. Along similar lines, the information may be used to determine that the user is indicating user input associated with a peripheral notification. Moreover, the information may be used to determine a suitable presentation of data (e.g., visual data) to the user, such as by considering whether the user is operating a motorcycle at the time the data is presented, as described in greater detail below.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some embodiments, a display may refer to display on a screen, on a wall, on glasses or a visor (e.g., near-eye-display), in the air, etc. In some embodiments, the user interface 116 may include more than one display, such as a main display and at least one peripheral display. Along these lines, the user interface 116 may include any number of displays (e.g., main and/or peripheral). In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

In some embodiments, the user interface 116 may comprise a pass-through display. Likewise, in embodiments wherein the apparatus 102 is embodied as a mobile terminal 10, the display 28 may be embodied as a pass-through display. In some embodiments, a pass-through display may be configured to present images (e.g., text, icons, pictures, videos, visual attractants, etc.) in an at least partially transparent form (e.g., image overlay) such that a user may be able to see through the images being presented. The degree of transparency may be variable from fully transparent, where the image is not shown, to fully opaque or non-transparent, or any degree therebetween. Additionally, in some embodiments, the degree of transparency may vary across the entire display.

For example, in some embodiments the user interface 116 may comprise one or more pass-through displays provided on a visor of a helmet, such that, when worn by the user, the user may be able to see objects in front of him through the visor while also being able to see images and information presented on the display portions of the visor, as described in greater detail below. Though some example embodiments are described herein with respect to a pass-through display, other user interfaces are contemplated (e.g., presentation screen, projection display, among others).

As such, some example embodiments may provide for an apparatus (e.g., apparatus 102) for presenting information through a device comprising a display, such as the helmet 150 shown in FIG. 3. The apparatus with a pass-through display may provide a visual overlay of images on a substantially transparent display surface, such as through a visor 160 of the helmet that appears to be a normal visor. This visual overlay may allow a user to view objects and people in their typical, un-obscured field of view while providing additional images that may be displayed on the pass-through display. The visual overlay of the images may be of various opacity ranging from transparent (or 0% opacity) to opaque (or 100% opacity). For example, the images presented on the pass-through display may, in some cases, fully occlude the user's vision beyond the display, at least in the portion of the display in which the image is presented (e.g., in peripheral areas of the visor 160, where information is presented). With reference to FIG. 3, for example, the visor 160 may have two notification display regions 162, 164 positioned above the user's direct line of sight, such that, even when images are presented in the notification display regions, the user's view through the visor, for the most part, is unimpaired. In some embodiments, the presented images may be partially transparent such that the user is able to see the environment beyond the pass-through display (e.g., through the presented images).

Example embodiments may also present information that is arranged at the edges of the pass-through display or that include a central area of the display which is substantially transparent while presenting a less transparent and possibly opaque image around the substantially transparent area. Such an embodiment may allow a user to view his environment while also providing images for the user to view. For example, in FIG. 3, a portion of the visor 160 in the user's direct line of sight may remain transparent to allow the user to see through the visor at all times (such as to see the road ahead while operating a motorcycle), whereas notification display regions 162, 164 may be provided near the top edge of the visor (e.g., above the user's direct line of sight) for presenting images that convey certain information to the user.

Apparatuses with pass-through displays allow for the presentation of two-dimensional (2-D) and three-dimensional (3-D) visual elements. Two-dimensional graphical elements rendered in the plane of the display can present the user with a user interface, status elements, or other images as would be viewed on a typical computer screen or display of a mobile terminal (e.g., display 28 of mobile terminal 10). These 2-D elements can communicate messages, alert the user with a notification, render an application that is currently in use, etc. Further 2-D elements may provide images regarding an object that a user of the pass-through display is viewing through the display, such as by identifying a point-of-interest or landmark that a user is viewing. Such identification may be accomplished by various means including object recognition software or object recognition in conjunction with location identification (e.g., via Global Positioning System (GPS) signals) of the apparatus (e.g., apparatus 102) or the device to which they are in communication, such as mobile terminal 10. Three-dimensional elements can be rendered on top of the environment and seen through the pass-through display to identify objects, provide navigation, etc.

FIGS. 3 and 4 illustrate a helmet 150 as being one example of an apparatus (e.g., apparatus 102) with a pass-through display. As depicted, the helmet 150 may include a body portion 155, which may be opaque, that is configured to surround the head of the user in a protective capacity and a visor 160 or other transparent lens portion that is configured to protect the user's eyes from wind and particles while allowing the user to see the road before him for operating the vehicle. In some embodiments, the helmet 150 may comprise (or be in communication with) a processor (e.g., processor 110) that is configured to control presentation of images in the helmet. For example, in the depicted embodiment of the helmet 150, the processor may be configured to control presentation of images in the notification display regions 162, 164, which may be a single display or multiple displays. In some embodiments, the images presented on the notification display regions 162, 164 may be independent and/or they may be complementary. Moreover, the processor (e.g., processor 110) may in some cases be embodied by the helmet (such as when the processor is incorporated in or otherwise supported by the body 155 of the helmet), while in other cases the processor may be embodied by a device that is distinct from, but in communication with, the helmet (such as the mobile terminal 10 of FIG. 2, e.g., the user's cellular telephone).

As illustrated in FIG. 4, a user (not shown) may look through the visor 160 of the helmet and see a city skyline 170 in front of him as he rides his motorcycle down the road. In some embodiments, the helmet 150 may be configured to cause presentation of images in one or more of the notification display regions 162, 164. In the depicted embodiment, for example, the description "CITY AVENUE" 180 is being presented to the user in one of the notification display regions 162 to indicate that the user is travelling down City Avenue (e.g., using GPS technology to identify the user's current location). Though words are shown as being presented on the display, embodiments of the present invention contemplate presenting other types of images on the display (e.g., pictures, videos, maps, notifications, visual attractants, etc.), as described below. Additionally, though the words shown in FIG. 4 are not transparent, embodiments of the present invention contemplate presentation of at least partially transparent images on the display.

It should also be noted that while FIGS. 3 and 4 each illustrate one example of an apparatus with a pass-through display, numerous other apparatuses configured with a pass-through display are contemplated for embodiments of the present invention (e.g., a motorcycle windshield, eyeglasses, etc.). Moreover, embodiments of the present invention are not meant to be limited to apparatuses with pass-through displays and may be useful with other example apparatuses, such as any apparatus 102 described herein (e.g., a mobile computing device, a fixed computing device, etc.).

Returning to FIG. 1, the UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, sensor 118, and/or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like. The UI control circuitry 122 and the touch display may be embodied in the helmet 150 shown in FIG. 3 or in the mobile terminal 10 shown in FIG. 2. For example, the touch display may be the touch display of a user's cellular telephone, and the telephone may be in communication with the user's helmet. Thus, by interacting with the touch display of the phone, the user may be able to cause and/or configure the presentation of images on the helmet (e.g., the pass-through display of the helmet visor 160 shown in FIGS. 3 and 4).

Turning now to FIG. 5, in general, an apparatus 102, such as an apparatus embodied by the mobile terminal 10 of FIG. 2 (e.g., a cellular telephone), is provided that has a touch screen display 200. As described above, the apparatus 102 may comprise at least one processor (e.g., processor 110 of FIG. 1) and at least one memory (e.g., memory 112 of FIG. 1) including computer program code. The at least one memory and the computer program code may be configured to, with the processor, cause the apparatus 102 to at least determine that a helmet (such as the helmet 150 of FIG. 3) is being worn by a user while a navigation event is occurring. The apparatus 102 may further be caused to determine a set of navigation notifications associated with the navigation event. The set of navigation notifications may be tailored for presentation in the helmet, as described below. Furthermore, the at least one memory and the computer program code may be configured to, with the processor, cause the apparatus 102 to cause the set of navigation notifications to be presented in the helmet.

For example, before embarking on a journey, a user may interact with the touch display 200 of his phone 102, as shown in FIG. 5, or another navigation device to get directions for traveling from point A (the user's current location) to point B (the user's desired destination). As a result, certain navigation data may be obtained (such as via GPS) and presented to the user on the touch display 200, as shown in FIG. 6. The resulting navigation data may include, for example, a map 250 of the area to be traveled, a route 260, and one or more waypoints 270 or other points of interest along the route. The navigation data may further include text 280 describing turn-by-turn directions and mileages and/or travel times associated with each step of the directions. The turn-by-turn directions may be provided in a list, as shown. In addition, the navigation data may include one or more trip summaries 282, 284. One trip summary 282 may describe the distance left to be traveled to arrive at the destination (1.5 miles in the depicted example). Another trip summary 284 may convey the estimated travel time to arrive at the destination (5 minutes in the depicted example). Other information may also be provided that is designed to facilitate travel from point A to point B, such as the location of nearby restaurants, gas stations, and hotels. The navigation data may, in some cases, also include advertisements and/or suggested attractions along the calculated route.

Although helpful for providing context to the user of the route to be taken and additional information regarding the planned route, presentation of all the navigation data (e.g., the navigation data shown in FIG. 6) may be overwhelming to a user who is operating a motorcycle at the same time that he is navigating his way from point A to point B. The presentation of the map 250, for example, may be confusing and may require too much of the user's attention to comprehend, which may in turn take the user's focus off the road being traveled and put the user at risk of having an accident. For example, in looking down at the map 250 or list 280 of turn-by-turn directions being presented on the touch display 200 of his phone, the user may not see a car or other obstacle in his path and/or may fail to react timely to other changes in the driving conditions (e.g., animals, road conditions, weather conditions, etc.), putting the user's safety in jeopardy.

Accordingly, embodiments of the present invention may provide a sensor 190 on the helmet 150 (such as the sensor 118 of FIG. 1) that is configured to detect that the user is wearing the helmet (e.g., via a proximity sensor) and/or that the user is riding a motorcycle (e.g., via an IMU) while a navigation event is occurring. The navigation event may be triggered, for example, by the user's request for directions from point A to point B via the apparatus 102 or by receipt from the user of an indication that the user's navigation device (e.g., the apparatus) is in a navigation mode. In a case in which the apparatus 102 is embodied by the user's phone and the helmet is a peripheral display device, signals from the sensor 190 may be received at the user's phone, and a processor of the phone may determine that the user is wearing the helmet while the navigation event is occurring. Similarly, in embodiments in which the apparatus is embodied by the helmet 150, a processor may be provided on the helmet and may communicate with the sensor 190 and the navigation device (e.g., the user's phone) conducting the navigation event to make the determination that the helmet is being worn by a user while a navigation event is occurring.

In response to the determination that the user is wearing the helmet and is participating in a navigation event, a set of navigation notifications 300, shown in FIG. 7 may be determined that is associated with the navigation event. The set of navigation notifications may be tailored for presentation in the helmet (e.g., via the pass-through display of the visor 160). For example, each navigation notification may comprise one step of the turn-by-turn directions that has been formatted, edited, shortened, simplified, or otherwise optimized to provide the user with a succinct instruction as to the next step in the directions for travel. Said differently, the set of navigation notifications 300 may be a first set of navigation notifications, and the at least one memory and the computer program code may be configured to, with the processor, cause the apparatus 102 to determine the first set of navigation notifications 300 to be different than a second set of navigation notifications associated with the navigation event, where the second set of navigation notifications is not tailored for presentation in the helmet.

For example, the second set of navigation notifications may comprise the navigation data shown on the display 200 of the user's phone or navigation device, illustrated in FIG. 6. This second set of navigation notifications (which may be determined before, after, or at the same time that the first set of navigation notifications is determined) may have a different appearance and/or different content as compared to the second set of navigation notifications. For example, the set of navigations notifications that is tailored for presentation in the helmet may include modifications of the text itself as well as modifications of the visual presentation of the instructions. With reference to FIGS. 6 and 7, for example, the set of navigation notifications may be tailored for presentation in the helmet by including fewer navigation notifications. For example, the turn-by-turn directions shown in FIG. 6 (e.g., the second set of navigation notifications) may be described in less detail to form the first set of navigation notifications. In other words, the instruction to "Merge onto I-77 N/US-21 N via EXIT 1C toward Statesville. 1.6 ml" of the second set (FIG. 6) may be modified to read "EXIT 1C 1.6 ml I-77 N/US-21 N" (FIG. 7) in the first set. Alternatively or additionally, the set of navigation notifications presented in the helmet may not include presentation of a map.

In some embodiments, tailoring of the navigation data to determine the set of navigation notifications for presentation on the helmet may include providing a visual indication of upcoming navigation operations, such as taking a turn, avoiding a turn, changing lanes, margining, etc. These visual indications may be provided absent information providing broader context, such as a map or complete list of directions for travelling the desired route. For example, referring to FIG. 9, the visual indications may include an arrow 310 indicating a left turn, absent information regarding context (such as a map or a street name). In the depicted example, proximity of the navigation operation (e.g., when to make the left turn) may be provided by indicating a travel distance 320 to the next navigation operation (e.g., how many miles before the turn). In some cases, the arrow 310 or other visual indication of the navigation operation may start to blink or change color as the user nears the location for performing the operation (e.g., as the user is within 0.5 mi. or 0.2 mi. of the turn).

In some embodiments, the set of navigation notifications may be based on a number of notification display regions in the helmet. With reference to FIG. 8, for example, two notification display regions 162, 164 are provided on the display of the visor 160. The at least one memory and the computer program code may be configured to, with the processor, cause the apparatus 102 to determine the set of navigation notifications based on the number of notification display regions in the helmet. For example, as two notification display regions 162, 164 are provided in FIG. 8, the set of navigation notifications may be determined to include a description of the navigation operation 182 and the travel distance 184 to the navigation operation (Exit 1C in 1.6 mi., as shown), as well as the name of the street 186 involved in the navigation operation (I-77 N/US-21 N.).

Moreover, the at least one memory and the computer program code may be configured to, with the processor, cause the apparatus 102 to determine an allocation of the set of navigation notifications among the notification display regions 162, 164 in the helmet, such as to provide the most user-friendly and least distracting presentation of information. In the depicted example of FIG. 8, the description of the navigation operation 182 and the associated travel distance 184 is presented in the notification display regions 162 on the left, whereas the name of the street 186 involved in the navigation operation is presented in the notification display region 164 on the right. Although two notification display regions 162, 164 are provided near a top edge of the visor 160 in the depicted example, any number of notification display regions may be provided in any arrangement on the visor.

In this regard, in some embodiments, the user may be able to configure the set of navigation notifications and/or the allocation of the navigation notifications among the notification display regions in the helmet. For example, in the depicted embodiment, the user may interact with a configuration screen presented on the touch display of the user's phone to provide inputs regarding options such as the number of notification display regions desired, the position of the notification display regions, the size of the notification display regions, the opacity of the notification display regions, and the type of navigation data to be presented in the notification display regions. The user, for example, may wish to see only navigation notifications 310, 320 relating to the navigational operation to be performed (e.g., a turn ahead) and point of interest information 330, 340 (e.g., gas stations along the planned route). Furthermore, referring to FIG. 9, the user may prefer always to see point of interest information 330, 340 provided in a certain notification display region (e.g., region 162) and to see navigational operation information 310, 320 provided in another notification display region (e.g., region 164) and may configure the apparatus accordingly. In response to receiving such inputs from the user, the at least one memory and the computer program code may be configured to, with the processor, cause the apparatus 102 to determine the set of navigation notifications based on a user-configured set of navigation notifications and/or to determine an allocation of the set of navigation notifications among the notification display regions in the helmet based on a user-configured allocation setting.

Furthermore, in some embodiments, the at least one memory and the computer program code may be configured to, with the processor, cause the apparatus 102 to determine the set of navigation notifications to include at least one motorcycle specific notification. For example, the user may configure the apparatus to present navigation notifications that are of interest to the user as a motorcycle operator, but which may not be of interest or importance to drivers of automobiles, buses, pedestrians, etc. Such motorcycle specific notifications may include a turn angle of an upcoming curve, a grade of an upcoming hill, and/or weather conditions (e.g., temperature, ice warnings, wind speed, etc.). In some cases, the notification display regions may be configured by the user to be dynamic, such that one type of information may be replaced by another type of information under certain conditions. For example, a notification display region 162, 164 may be configured to present point of interest information, but as the user approaches a turn in the road, the point of interest information may be replaced by turn angle information.

In some embodiments, such when the apparatus 102 is embodied by the user's mobile terminal and is separate from the user's helmet and the pass-through display provided on the helmet, the apparatus (e.g., mobile terminal) may be connected to and in communication with the helmet display via wires or wirelessly. Through the mobile terminal interface in this example, the user may be able to obtain navigation data regarding a desired travel route and to configure what type of information is to be displayed via the helmet display during the ride, as described above. This may be considered an active mode of the apparatus. Once the configuration is complete and the navigation event is underway (e.g., the user has mounted the motorcycle and donned the helmet), the apparatus 102 may be considered to be in a passive mode. In the passive mode, the desired information may be displayed to the user via the helmet visor, as described above and illustrated in the figures, according to the configurations provided by the user via the mobile terminal's user interface, for example. In some embodiments, both the mobile device display 200 (FIG. 5) and the helmet display 160 (FIG. 9) may shown navigation data (such as navigation notifications); however, the type of data shown on each device may be different, as depicted. For example, the display 200 of the mobile terminal may show full navigational data, including a map 250 and a full list of directions 280, as shown in FIG. 6, whereas the display 160 of the helmet may only shown the set of navigation notifications tailored for presentation on the helmet, as shown in FIG. 9. In other cases, however, the user may configure the apparatus such that both displays 200, 160 shown the same navigation notifications.

Embodiments of the present invention provide methods, apparatus and computer program products for causing navigation notifications tailored for a helmet to be presented in the helmet. Various examples of the operations performed in accordance with embodiments of the present invention will now be provided with reference to FIGS. 10 and 11.

FIG. 10 illustrates a flowchart according to an example method 400 for causing navigation notifications tailored for a helmet to be presented in the helmet. The operations illustrated in and described with respect to FIG. 10 may, for example, be performed by, with the assistance of, and/or under the control of one or more of the processor 110, memory 112, communication interface 114, user interface 116, sensor 118, or UI control circuitry 122. Operation 402 may comprise determining that a helmet is being worn by a user while a navigation event is occurring. The processor 110, communication interface 114, and/or sensor 118 may, for example, provide means for performing operation 402. Operation 404 may comprise determining a set of navigation notifications associated with the navigation event, wherein the set of navigation notifications is tailored for presentation in the helmet. The processor 110 may, for example, provide means for performing operation 404. Operation 406 may comprise causing the set of navigation notifications to be presented in the helmet. The processor 110, communication interface 114, user interface 116, and/or UI control circuitry 122 may, for example, provide means for performing operation 406.

FIG. 11 illustrates a flowchart according to another example method 500 for causing navigation notifications tailored for a helmet to be presented in the helmet. The operations illustrated in and described with respect to FIG. 11 may, for example, be performed by, with the assistance of, and/or under the control of one or more of the processor 110, memory 112, communication interface 114, user interface 116, sensor 118, or UI control circuitry 122. Operation 502 may comprise determining a non-helmet specific set of navigation notifications associated with a navigation event, wherein the non-helmet specific set of navigation notifications is not tailored for presentation in a helmet. The processor 110 may, for example, provide means for performing operation 502. Operation 504 may comprise determining that the helmet is being worn by a user while the navigation event is occurring. The processor 110, communication interface 114, and/or sensor 118 may, for example, provide means for performing operation 504. Operation 506 may comprise determining a set of navigation notifications associated with the navigation event, wherein the set of navigation notifications is tailored for presentation in the helmet. The processor 110 may, for example, provide means for performing operation 506. Operation 508 may comprise causing the set of navigation notifications to be presented in the helmet. The processor 110, communication interface 114, user interface 116, and/or UI control circuitry 122 may, for example, provide means for performing operation 508.

FIGS. 10-11 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. For example, although the figures and examples described above refer to a pass-through display on a helmet visor, other pass-through displays may benefit from embodiments of the invention, such as eyeglasses, safety glasses, windshields, and the like. In addition, although the example of a motorcycle is used above, embodiments of the invention may be used by users who are operators of All-Terrain Vehicles (ATVs), boats, snowmobiles, automobiles, jet skis, and other vehicles. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining, by a processor, navigation directions associated with a navigation event;
   determining that a helmet is being worn by a user while the navigation event is occurring;
   determining, based on a number of notification display regions in the helmet available for display of a single navigation notification, a set of navigation notifications from the navigation directions associated with the navigation event, wherein the set of navigation notifications is tailored for display in the helmet; and
   providing the set of navigation notifications for display in the helmet over at least a portion of an environment in the user's current field of view through the helmet.

2. The method according to claim 1, wherein the set of navigation notifications is a first set of navigation notifications, wherein determining the first set of navigation notifications comprises determining the first set of navigation notifications to be different than a second set of navigation notifications associated with the navigation event, wherein the second set of navigation notifications is not tailored for presentation in the helmet.

3. The method according to claim 2, wherein determining the first set of navigation notifications comprises determining the first set of navigation notifications to include fewer navigation notifications than the second set of navigation notifications associated with the navigation event.

4. The method according to claim 1, wherein determining the set of navigation notifications comprises determining the set of navigation notifications to not include presentation of a map.

5. The method according to claim 1, wherein determining the set of navigation notifications comprises determining the set of navigation notifications to include at least one motorcycle specific notification, wherein the at least one motorcycle specific notification comprises at least one of: a grade of an upcoming curve; a grade of an upcoming hill; or weather conditions.

6. The method according to claim 1, wherein determining the set of navigation notifications comprises determining the set of navigation notifications based on a user-configured set of navigation notifications.

7. The method according to claim 1 further comprising determining an allocation of the set of navigation notifications among the notification display regions in the helmet, and wherein providing the set of navigation notifications further comprises providing the allocation of the set of navigation notifications among the notification display regions in the helmet.

8. The method according to claim 7, wherein determining the allocation of the set of navigation notifications among the notification display regions in the helmet is based on a user-configured allocation setting.

9. The method according to claim 1, wherein the helmet is connected to a navigation device.

10. The method according to claim 1, wherein the processor is embodied by a mobile terminal and the helmet comprises a peripheral display configured to present the set of navigation notifications.

11. The method according to claim 10, wherein providing the set of navigation notifications for display in the helmet comprising causing the set of navigation notifications tailored for presentation by the helmet to be presented upon the peripheral display of the helmet, and wherein the method further comprises causing navigational data in addition to the set of navigational notifications to be presented upon a display of the mobile terminal.

12. The method according to claim 1, wherein providing the set of navigation notifications for display in the helmet comprises providing the set of navigation instructions for display such that at least one object visible in the user's current field of view is un-obscured by display of the set of navigation notifications.

13. An apparatus comprising a processor and a memory including computer program code, the memory and the computer program code configured to, with the processor, cause the apparatus to:
 determine navigation directions associated with a navigation event;
 determine that a helmet is being worn by a user while the navigation event is occurring;
 determine, based on a number of notification display regions in the helmet available for display of a single navigation notification, a set of navigation notifications from the navigation directions associated with the navigation event, wherein the set of navigation notifications is tailored for display in the helmet; and
 provide the set of navigation notifications for display in the helmet over at least a portion of an environment in the user's current field of view through the helmet.

14. The apparatus of claim 13, wherein the set of navigation notifications is a first set of navigation notifications, wherein the memory and the computer program code are further configured to, with the processor, cause the apparatus to determine the first set of navigation notifications by determining the first set of navigation notifications to be different than a second set of navigation notifications associated with the navigation event, wherein the second set of navigation notifications is not tailored for presentation in the helmet.

15. The apparatus of claim 14, wherein the memory and the computer program code are further configured to, with the processor, cause the apparatus to determine the first set of navigation notifications by determining the set of navigation notifications to include fewer navigation notifications than the second set of navigation notifications associated with the navigation event.

16. The apparatus of claim 13, wherein the memory and the computer program code are further configured to, with the processor, cause the apparatus to determine the set of navigation notifications by determining the set of navigation notifications to not include presentation of a map.

17. The apparatus of claim 13, wherein the memory and the computer program code are further configured to, with the processor, cause the apparatus to determine the set of navigation notifications by determining the set of navigation notifications to include at least one motorcycle specific notification, wherein the at least one motorcycle specific notification comprises at least one of: a grade of an upcoming curve; a grade of an upcoming hill; or weather conditions.

18. The apparatus of claim 13, wherein the memory and the computer program code are further configured to, with the processor, cause the apparatus to determine the set of navigation notifications by determining the set of navigation notifications based on a user-configured set of navigation notifications.

19. The apparatus of claim 13, wherein the memory and the computer program code are further configured to, with the processor, cause the apparatus to determine an allocation of the set of navigation notifications among the notification display regions in the helmet, and wherein the memory and the computer program code are further configured to, with the processor, cause the apparatus to provide the set of navigation notifications by providing the allocation of the set of navigation notifications among the notification display regions in the helmet.

20. The apparatus of claim 19, wherein the memory and the computer program code are further configured to, with the processor, cause the apparatus to determine the allocation of navigation notifications among the notification display regions in the helmet based on a user-configured allocation setting.

21. The apparatus of claim 13, wherein the helmet is connected to a navigation device.

22. The apparatus of claim 13, wherein the apparatus is embodied by a mobile terminal and the helmet comprises a peripheral display configured to present the set of navigation notifications.

23. The apparatus of claim 22, wherein the memory and the computer program code are configured to, with the processor, cause the apparatus to provide the set of navigation notifications for display in the helmet by causing the set of navigation notifications tailored for presentation by the helmet to be presented upon the peripheral display of the helmet, and wherein the memory and the computer program code are further configured to, with the processor, cause the apparatus to cause navigational data in addition to the set of navigational notifications to be presented upon a display of the mobile terminal.

24. The apparatus of claim 13, wherein the memory and the computer program code are configured to, with the processor, cause the apparatus to provide the set of navigation notifications for display in the helmet by providing the set of navigation instructions for display such that at least one object visible in the user's current field of view is un-obscured by display of the set of navigation notifications.

25. Computer program product comprising a non-transitory computer readable medium having program code portions stored thereon, the program code portions being configured when said program product is run on a computer or network device, to:
 determine navigation directions associated with a navigation event;
 determine that a helmet is being worn by a user while the navigation event is occurring;
 determine, based on a number of notification display regions in the helmet available for display of a single navigation notification, a set of navigation notifications from the navigation directions associated with the navigation event, wherein the set of navigation notifications is tailored for display in the helmet; and provide the set of navigation notifications for display in the helmet over at least a portion of an environment in the user's current field of view through the helmet.

\* \* \* \* \*

UNITED STATES PATENT AND TRADEMARK OFFICE
CERTIFICATE OF CORRECTION

PATENT NO. : 9,146,124 B2  
APPLICATION NO. : 13/718270  
DATED : September 29, 2015  
INVENTOR(S) : Parada et al.

Page 1 of 1

It is certified that error appears in the above-identified patent and that said Letters Patent is hereby corrected as shown below:

<u>Title page,</u>
Item (71) Applicant: "Nokia Corporation" should read --Nokia Technologies Oy--.

Signed and Sealed this
Eighth Day of March, 2016

Michelle K. Lee
*Director of the United States Patent and Trademark Office*